United States Patent [19]

McConnell

[11] Patent Number: 4,976,012

[45] Date of Patent: Dec. 11, 1990

[54] METHOD OF FORMING A WEB

[75] Inventor: Ronald F. McConnell, West Chester, Pa.

[73] Assignee: E. I Du Pont de Nemours and Company, Wilmington, Del.

[21] Appl. No.: 31,794

[22] Filed: Mar. 30, 1987

Related U.S. Application Data

[63] Continuation-in-part of Ser. No. 445,166, Nov. 29, 1982, Pat. No. 4,715,924.

[51] Int. Cl.⁵ .............................................. D01G 25/00
[52] U.S. Cl. ......................................... 19/299; 19/301; 156/181; 156/433; 28/101; 28/289
[58] Field of Search .................. 156/181, 433; 19/299, 19/301; 28/101, 289

[56] References Cited

U.S. PATENT DOCUMENTS

| | | | |
|---|---|---|---|
| 3,226,794 | 1/1966 | Erb | 28/289 X |
| 3,318,013 | 5/1967 | Erb | 229/63 |
| 3,378,898 | 4/1968 | Mendes | 28/21 |
| 3,616,070 | 10/1971 | Lemelson | 156/446 |
| 3,902,644 | 9/1975 | Bous | 226/44 |
| 4,069,566 | 1/1978 | Sumimoto et al. | 28/289 |
| 4,137,354 | 1/1979 | Mayes, Jr. et al. | 156/175 X |
| 4,163,305 | 8/1979 | Semjonow et al. | 19/299 |
| 4,185,064 | 1/1980 | Schippers | 264/210.2 |
| 4,247,503 | 1/1981 | Venot et al. | 264/168 |
| 4,353,772 | 10/1982 | Groeber | 156/433 |

FOREIGN PATENT DOCUMENTS

| | | | |
|---|---|---|---|
| 0110698 | 6/1984 | European Pat. Off. | |
| 3003666 | 8/1981 | Fed. Rep. of Germany | |
| 0482903 | 1/1973 | Japan | 156/167 |
| 1088931 | 10/1967 | United Kingdom | 19/299 |
| 2024052 | 1/1980 | United Kingdom | |

OTHER PUBLICATIONS

American Machinist, vol. 125, #11, Nov., 1981, pp. 3 & 179.

*Primary Examiner*—Peter A. Nelson

[57] ABSTRACT

A method of preparing a reinforcing web for a composite structure. A continuous strand is deposited in a bed of pins according to a desired pattern such as overlapped rows of shingled loops.

8 Claims, 9 Drawing Sheets

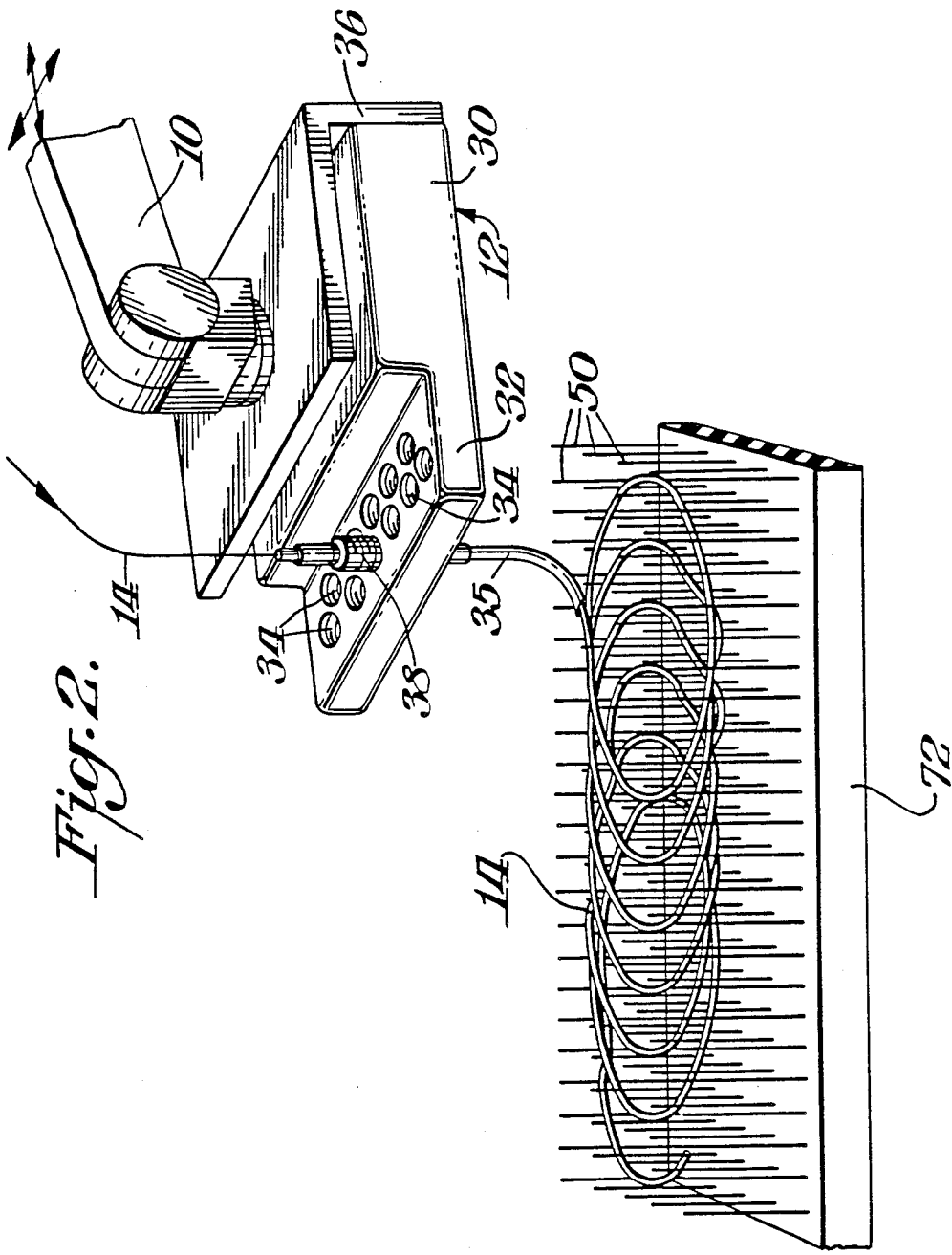

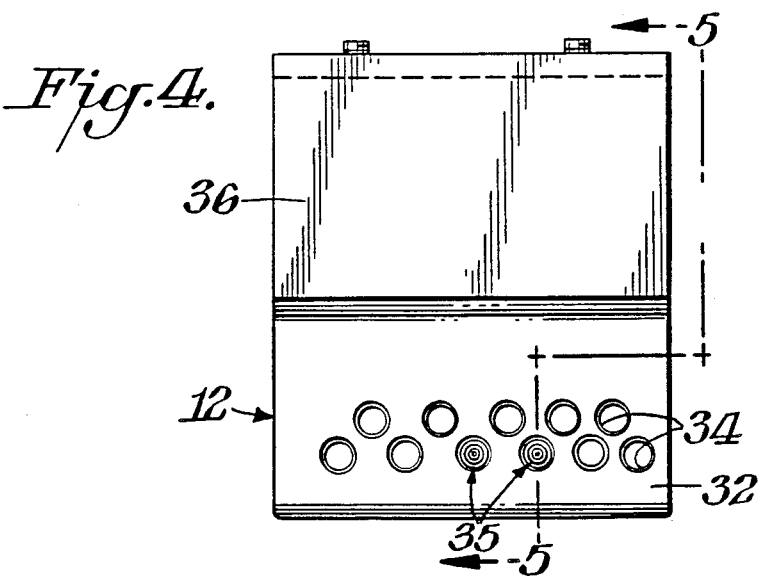
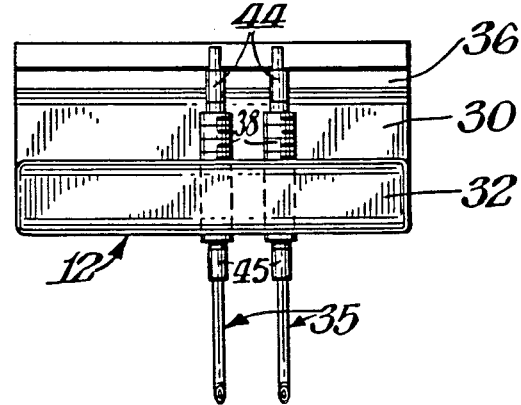
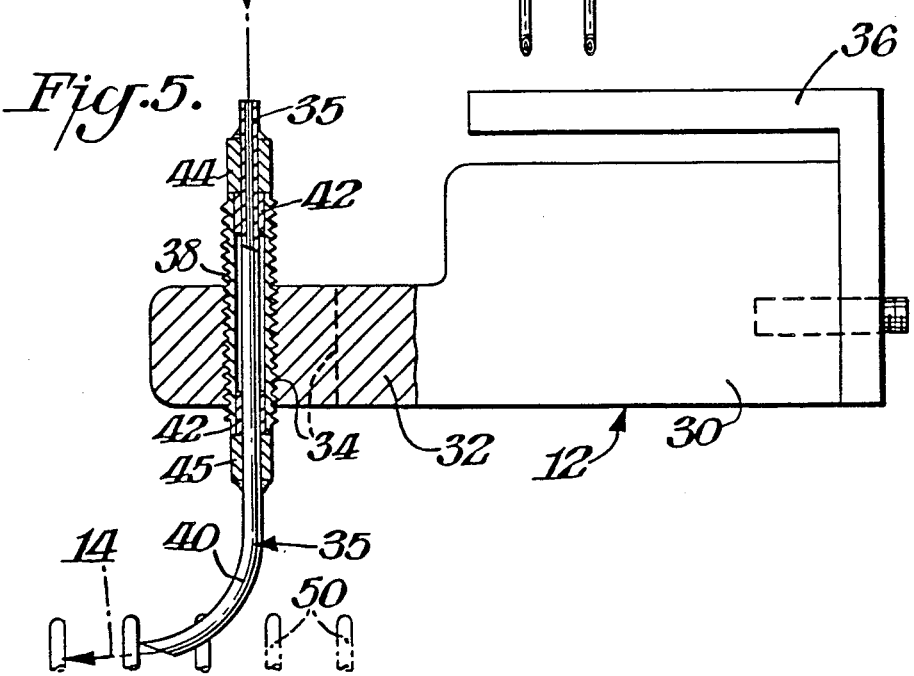

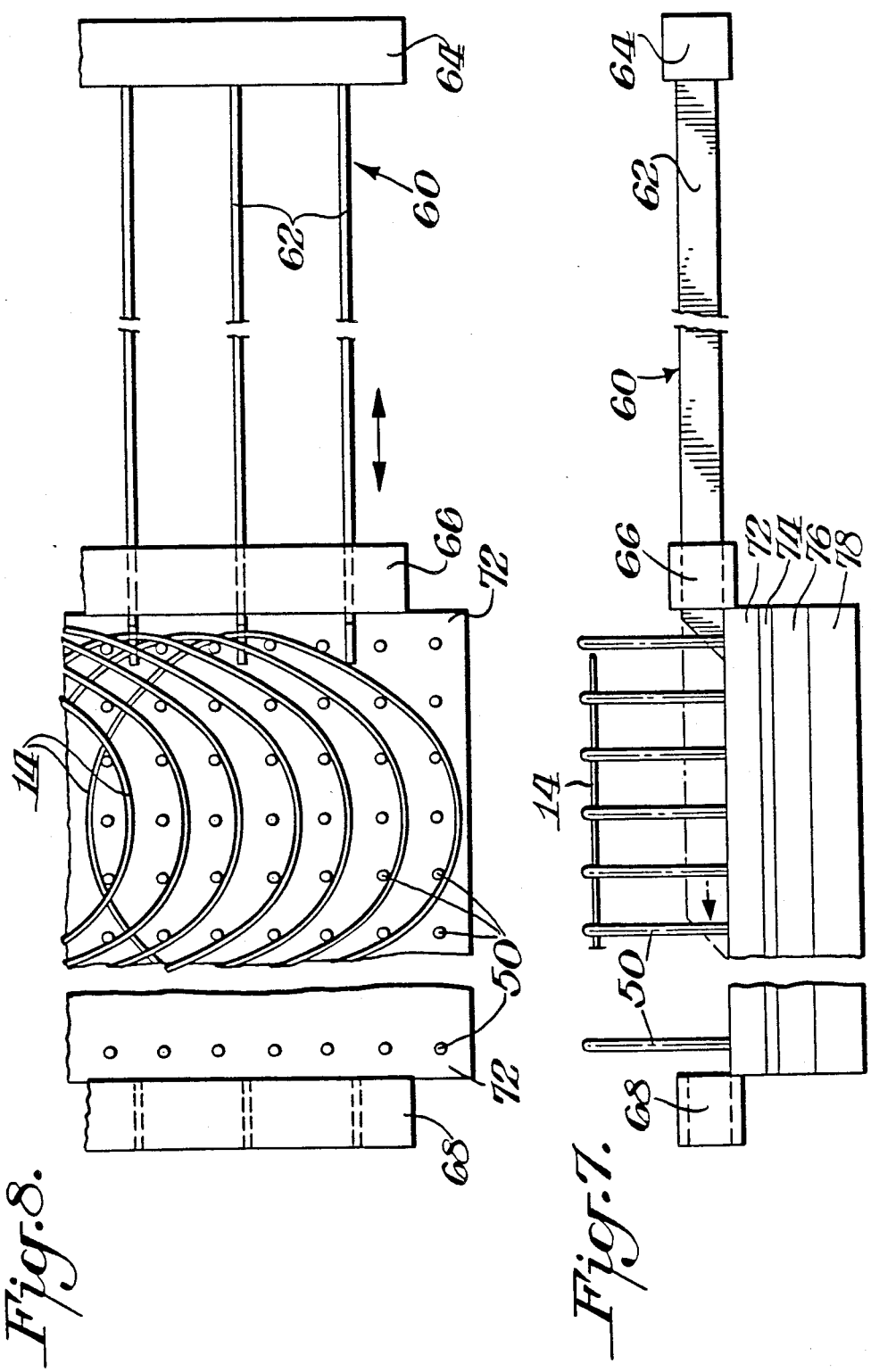

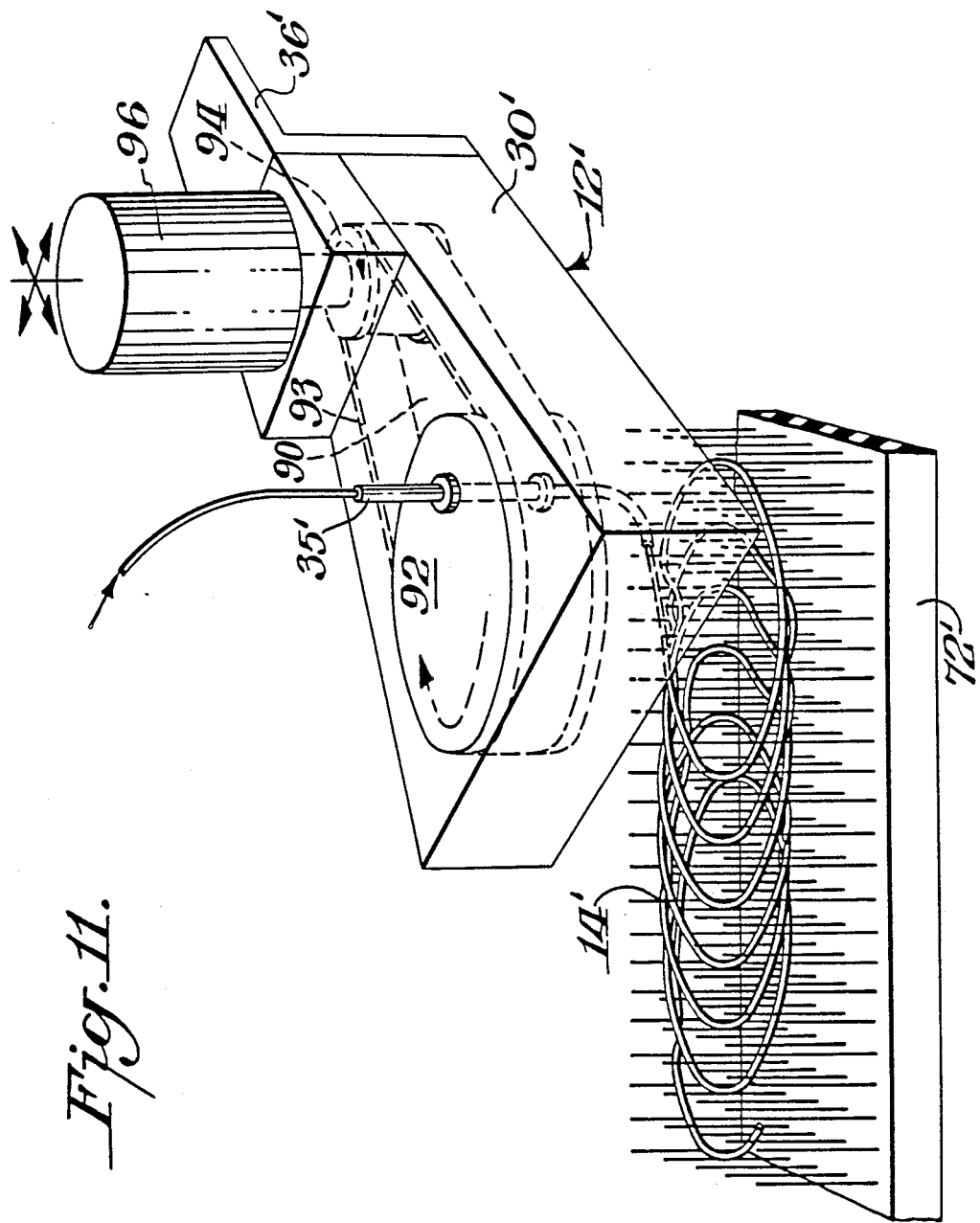

METHOD OF FORMING A WEB

CROSS-REFERENCE

This is a continuation-in-part of my copending application Ser. No. 445,166, filed Nov. 29, 1982, now U.S. Pat. No. 4,715,924.

BACKGROUND

Plastic composites reinforced with fibers are known and used in a wide variety of aerospace, industrial and sporting applications. Initially, the reinforcing structures were woven fabrics which provided uniformity throughout the composite. However, nonwoven webs are now being used because they are less expensive than woven fabrics. Normally such webs have been laid down randomly or in a semi-ordered fashion. It is apparent that improved composites could be produced if the nonwoven web could be laid down in a precisely ordered fashion. In some composites, complete uniformity is desired, whereas, in others, the fiber density should be greater at the locations where the stresses are greater.

SUMMARY

According to the method of the present invention, a reinforcing web for a composite structure is prepared by first laying the end of a continuous strand in a bed of densely packed pins. After the end is located, the strand is deposited continuously beneath the tops of the pins by guiding it through the bed according to a desired pattern, while simultaneously pulling the strand from a package. When a complete web has been laid, the strand is cut and the web is transferred intact for further processing into a composite structure. In the guiding step, the strand is advanced in a pattern of repeating, closed geometrical shapes.

DRAWINGS

FIG. 2 is a fragmentary, perspective enlargement of the web-forming apparatus shown in FIG. 1.

FIGS. 3–5 are front, top and side views of the winding head shown in FIGS. 1 and 2, FIG. 5 having been taken on line 5—5 in FIG. 4.

FIGS. 7 and 8 are side and top views of a device for transferring a web from the bed of pins shown in FIGS. 1 and 2.

FIG. 11 is a perspective view of a modification of the apparatus.

DESCRIPTION

Figure 1:
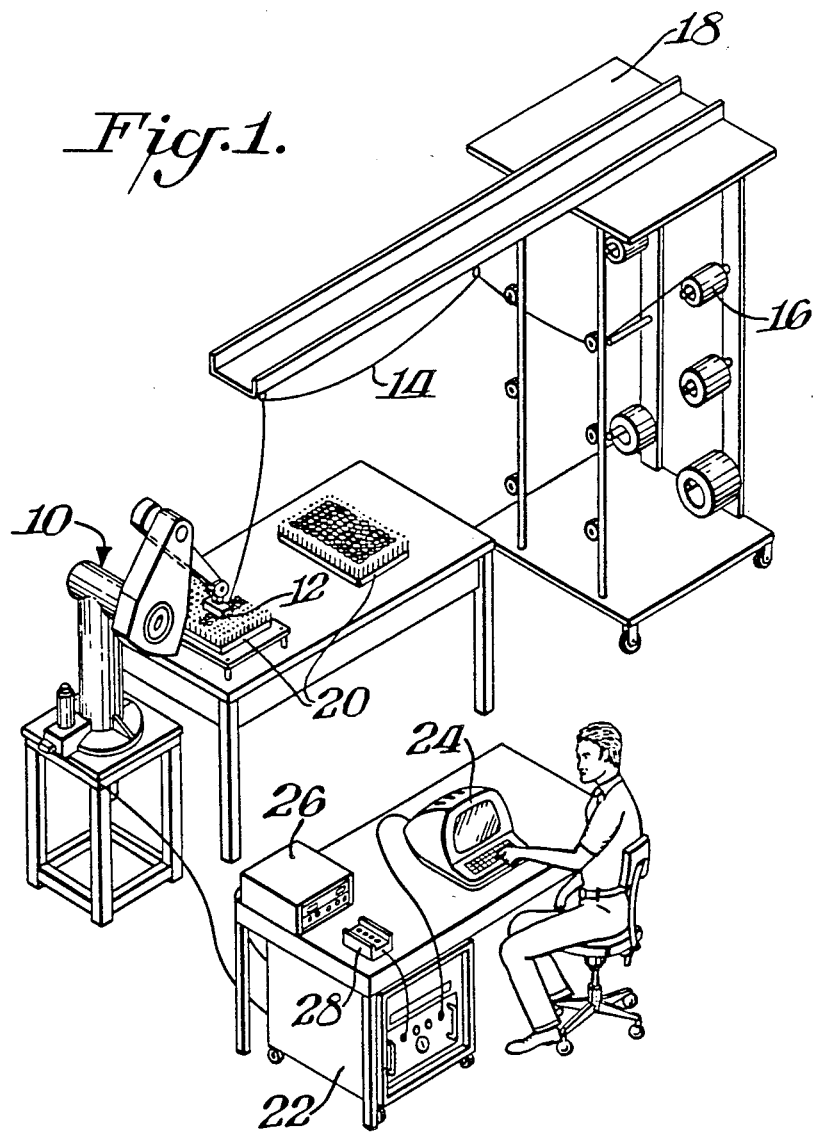
FIG. 1 is a schematic illustration of an installation which has been used in the practice of the invention.

In FIG. 1, an apparatus useful in the practice of the present invention is shown in association with other elements of a web-forming installation. On the arm of a robot 10, there is a dispensing head 12 through which a filamentary yarn 14 is pulled from a package 16 on a creel 18. Robot 10 functions as an automatic manipulator for moving head 12 relative to a densely packed bed 20 of deflectible pins according to a program set in a microprocessor within a controller 22. Other elements coupled to the controller are a CRT terminal 24, a direct current (dc) power supply 26 and a teach pendant or manual controller 28. As will be explained more fully hereinafter, yarn 14 is held by its engagement with pins in bed 20 and pulled from package 16 by the movement of head 12 in response to instructions from the programmed controller 22, i.e., according to the pattern desired for a given web.

Referring to FIGS. 2–5, the robotized winding head 12 includes a block 30 having a step 32 provided with threaded passages 34 for one or more strand-guiding tubes 35. Block 30 is fastened to a bracket 36 which, in turn, is fastened to a mounting disc at the end of the arm on robot 10.

Each tube 35 has a straight length that extends through a threaded housing 38 and terminates in a curved length or horn 40. The straight length is freely rotatable in spaced sleeve bearings 42 in housing 38 and is retained by collars 44, 45. Housing 38 is mounted in one of the threaded passages 34.

Figure 10:
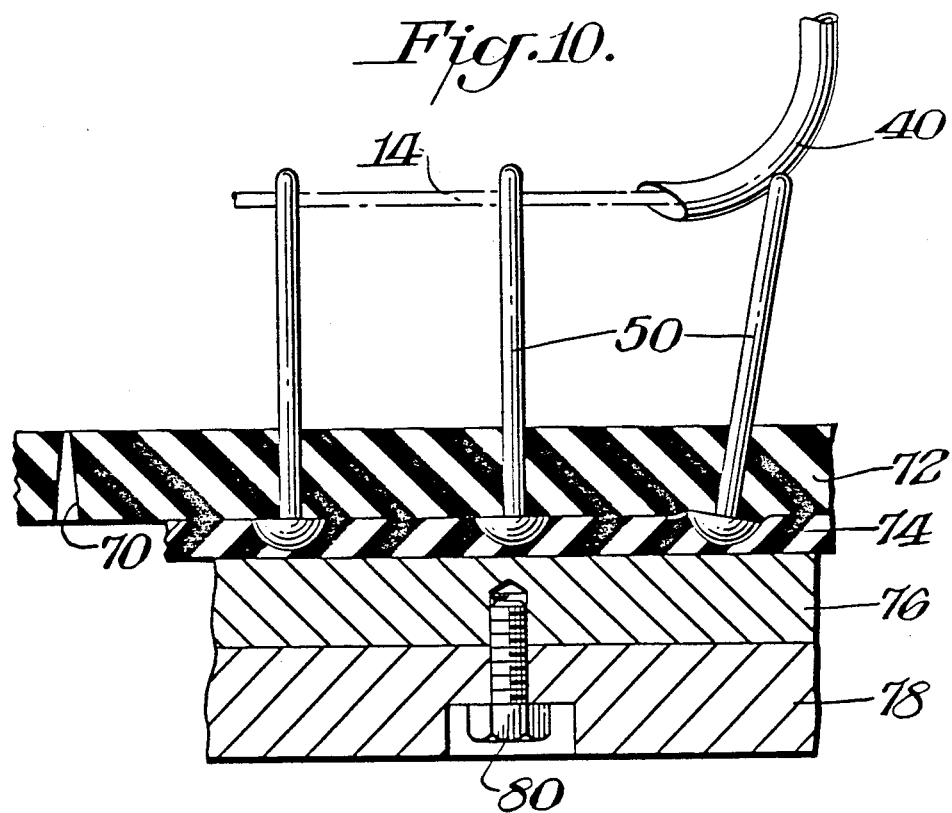
FIG. 10 is a fragmentary, enlarged view of the bed shown in FIGS. 1, 2 and 7–9.

Referring now to FIGS. 2, 5 and 10, horn 40 on tube 35 projects into the bed 20 of pins 50 and trails the straight length as head 12 is moved by robot 10. Horn 40 is free to move in either direction, depending on its location with respect to the pins it contacts. In addition, pins 50 are deflected as horn 40 moves through the bed. Due to the resilience of their mounting, the pins spring back toward a normally upright position and hold yarn 14 in the desired pattern. As noted above, yarn 14 is anchored in the bed by frictional engagement with the pins and is pulled from package 16 by the programmed movement of dispensing head 12. Horn 40 dispenses yarn 14 beneath the tops of the pins 50 and also engages preceding loops to insure their placement at the desired depth in the bed 20.

Figure 6:
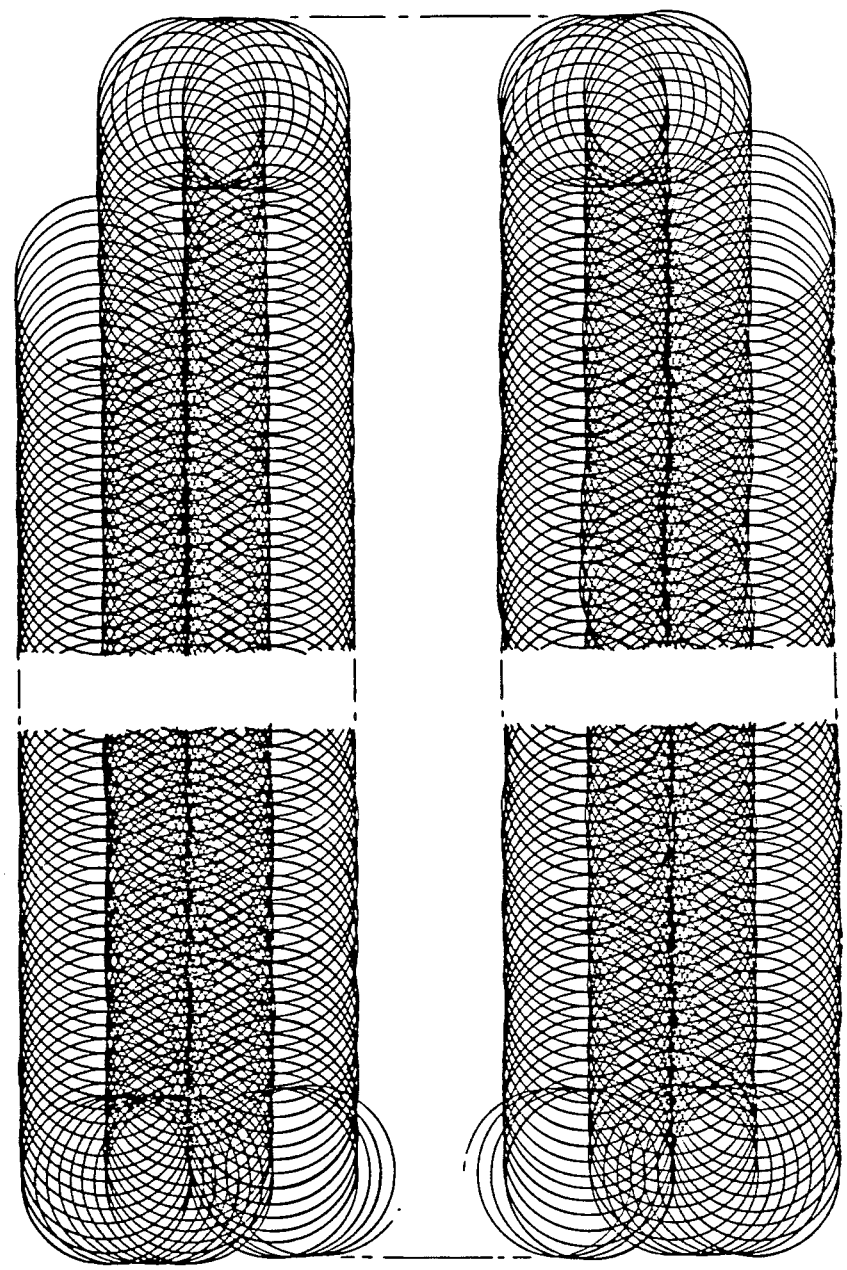
FIG. 6 shows fragments of a web formed with precise uniformity by the method of the present invention.

With the winding head 12 fixed to the robot, as shown in FIG. 2, a web of the type shown in FIG. 6 is formed by programming the robot to move the head in a circular motion as it is advanced longitudinally through the length of the pattern. At the end of each row, the head is traversed laterally and advanced longitudinally in the reverse direction. In actuality, the circular motion is a succession of orthogonal, linear steps but the yarn is deposited in a shingled series of in-line loops due to the manner in which pins 50 spring back toward their normal upright position. Instead of a circular motion, the robot could as well be programmed to move in other patterns of repeating, closed geometrical shapes such as squares or triangles.

Figure 9:
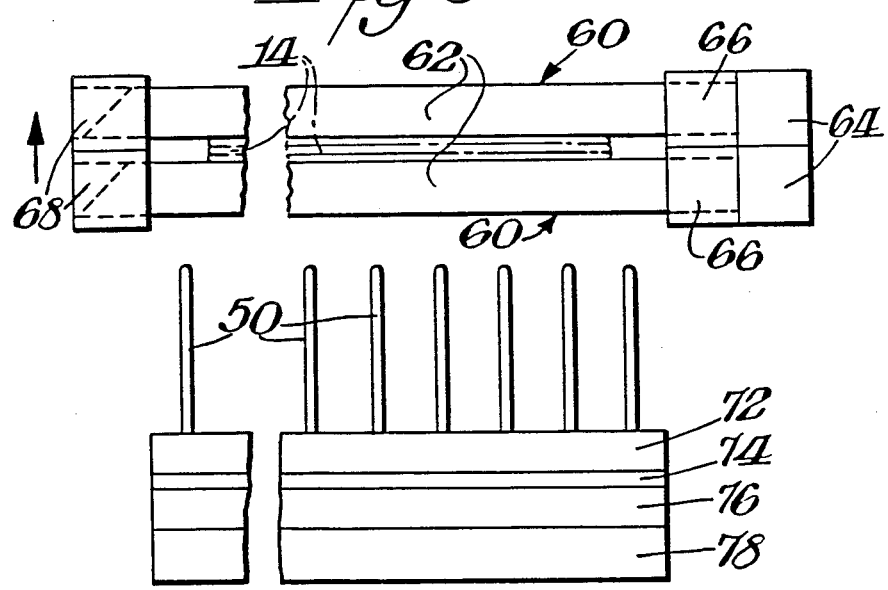
FIG. 9 illustrates transfer of a web from the bed on which it was formed.

A transfer device 60 for removing a web from the bed of pins 50 is shown in FIGS. 7 and 8. Device 60 includes a plurality of spaced blades 62 attached at one end to a bar 64. The free ends of the blades 62 are held in alignment by a sliding bar 66 as they are inserted into the bed of pins beneath a formed web. Once passed beneath the web, the ends of blades 62 are retained in another bar 68. A second device 60 is located as shown in FIG. 9 and the assembly is then used to remove the web from the bed of pins. A binder resin is applied to insure the integrity of the web which can then be transferred to a suitable mold for fabrication of a composite structure.

Details of a base and retainer for the bed of pins 50 appear in FIG. 10 where it will be seen that the shanks of the pins project through holes 70 in an elastomeric sheet 72. The heads of the pins are embedded in a layer 74 of elastomeric adhesive which also serves to adhere sheet 72 to a retainer plate 76. A selected number of retainers is assembled and each is fastened to a base plate 78 by screws 80.

The modification shown in FIG. 11 has a head 12' adapted for attachment to the arm of a robot. Head 12' includes a block 30' provided with an aperture 90 which receives a rotor 92, a belt 93 and a pulley 94. A motor 96 is coupled to the pulley 94 for driving rotor 92. A strand-guiding tube 35' is mounted eccentrically in rotor 92. With this embodiment, the robot can be programmed to move head 12' linearly and the rotary movement of rotor 92 causes a shingled series of in-line loops to be deposited in the bed of pins. The curved horn on strand-guiding tube 35' pushes successive loops to the same level in each row, thus forming an ordered array of the type shown in FIG. 6.

In the end uses where composites are reinforced with a nonwoven web and subjected to localized stresses, the illustrated apparatus is capable of precisely locating extra fibers at the needed locations to handle these localized stresses.

Further, many composites in their final form have openings in them. In the past, the fabric would be cut and a portion removed to accommodate the openings. This causes fabric waste and fiber discontinuities. The apparatus disclosed herein can precisely lay down fibers around such openings, providing improved reinforcement and reduced fiber waste.

Where used herein, the term "strand" is meant to denote a yarn of continuous filaments or a yarn spun from staple fibers. It also denotes such a yarn joined with another of the same or a different composition. In the latter respect, yarns of graphite, polyamide and polyester have been used to prepare webs.

According to the method of the present invention, yarn 14 from a package 16 is threaded through a freely rotatable tube 35 and laid into the bed 20 of pins 50 manually. The head 12 is placed so that the curved length or horn 40 of tube 35 lies within the bed 20 below the tops of pins 50. Under guidance, preferably robotic, head 12 including tube 35 is moved in a selected pattern through pins 50, pulling yarn 14 from package 16 and depositing it continuously in bed 20. Both the pins and horn 40 are deflected as the horn moves through bed 20. At the completion of a web, the strand is cut, a device 60 is used to remove the web intact, a binder resin is applied to insure its integrity and the web is laid up with additional plies. Then, the entire layup is impregnated with a resin, covered with a vacuum bag and pressed under suitable pressure and temperature conditions and for the requisite time to form an energy absorbing panel.

Alternatively, the reinforcing web is fabricated from reinforcing fiber or yarn which is pre-impregnated or coated with a thermoplastic polymer matrix. The web is subsequently fused at a suitable temperature and pressure either as a single ply or as a layup of multiple plies, with or without the need for additional binder resin. The coated yarns may even be fused together during the lay down process.

Likewise, the reinforcing yarn may be pre-impregnated with a thermoset polymer matrix and subsequently cured with or without the need for additional binder resin.

Figure 12:
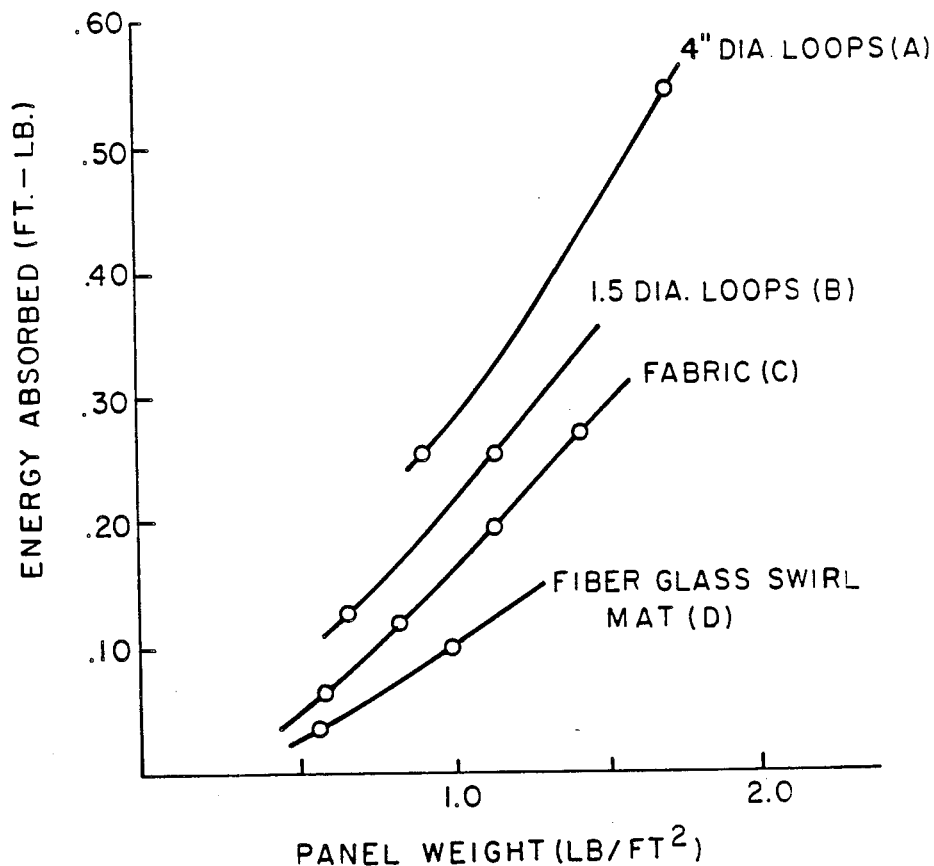
FIG. 12 is a graphic representation of comparisons in energy absorptions between panels reinforced with webs prepared according to the present invention and others reinforced by fabrics and mats.

Graphs showing improved impact resistances for panels A, B reinforced with webs made in accordance with the method of the present invention are shown in FIG. 12. The panels A and B were reinforced with loops of filamentary, 1140 denier Kevlar ® 49 aramid fiber. Panel C was reinforced with plies of a plain weave fabric of the same yarn. Panel D was reinforced with a swirl mat of glass fibers. All of the panels were 50% polymer by weight and the polymer was an amorphous polyethylene terephthalate containing a glycol additive.

Energy absorption properties of the panels were measured in accordance with a standard test method (ASTM D 3763-79) for high-speed puncture properties of rigid plastics. The maximum loads required to puncture the panel and the displacement at the point where the panel punctures are recorded. Absorbed energy (FIG. 12) is calculated from the recorded information.

Figure 13:
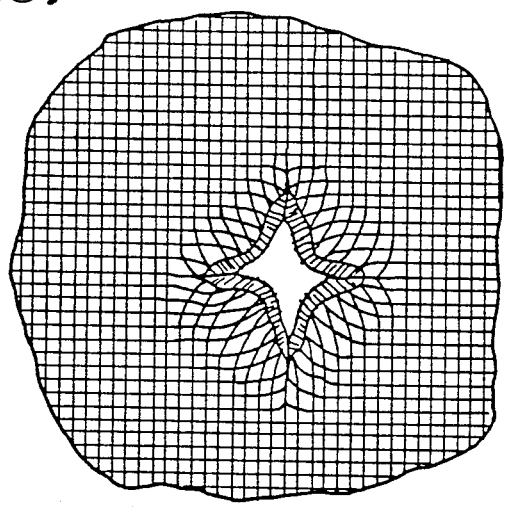
FIGS. 13 and 14 show effects of impact tests of panels reinforced with fabrics and with the webs of the present invention.
Figure 14:
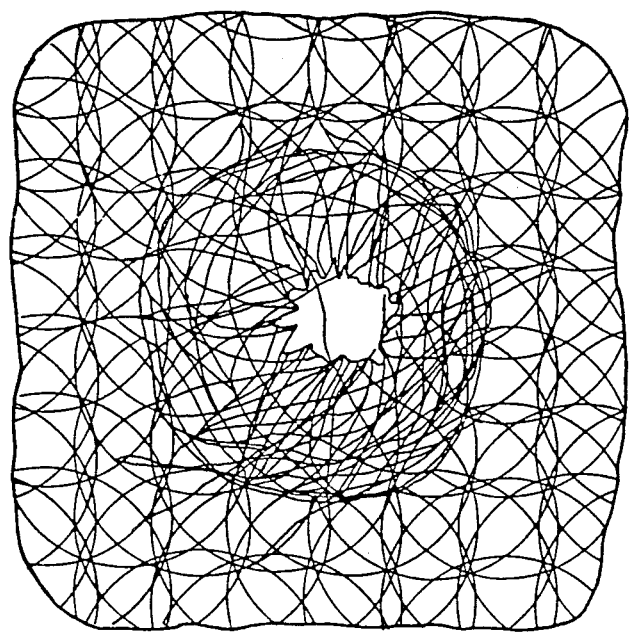

Locations where panels reinforced with a fabric and with the looped webs of the present invention have been tested are represented in FIGS. 13 and 14, respectively. In FIG. 13, it will be seen that a raised, impacted area is relatively small. The plunger used in the test not only penetrated the panel but also tore the fabrics in lines between the wales of the plain weave. Otherwise, there were no failures due to breakage or fibers pulled out of the matrix. In FIG. 14, there is a larger area of interaction in which the loops pulled out of the matrix around the puncture. In turn, those loops pulled others out and the pull-out was progressive throughout the raised area of interaction.

What is claimed as new and desired to be secured by Letters Patent is:

1. A method of producing a nonwoven web comprising:
   providing a plate having a perforated, elastomeric sheet adhered thereto with deflectible pins resiliently mounted in said perforations,
   providing a robotized head for depositing a continuous strand in a programmed pattern,
   wherein said head includes a freely rotatable, strand guiding tube projecting therefrom and terminating in a horn having a curved length, and
   lowering said horn below the tops of the pins and then depositing said strand from said horn in between said pins according to said programmed pattern.

2. The method of claim 1 wherein said head is a block having a passage therethrough and said tube is rotatably mounted in said passage.

3. The method of claim 1 wherein said head has an aperture extending therethrough and a driven rotor mounted in said aperture, said rotor having an eccentric passage therethrough, said tube being rotatably mounted in said passage.

4. The method of claim 1 wherein the pins are aligned in a plurality of rows and wherein is provided a transfer device for lifting a deposited strand from the bed, said transfer device comprising a plurality of blades and transverse bars holding the blades in space parallelism each blade being adapted for insertion into said bed beneath a deposited pattern, between adjacent rows of pins.

5. A method of preparing a reinforcing web for a composite structure comprising:

laying the end of a continuous strand in a bed of densely packed deflectible pins, resiliently mounted in said bed, depositing the strand continuously beneath the tops of said pins by guiding it therethrough according to one or more desired patterns while simultaneously pulling the strand from a package, and then cutting the strand and transferring the web intact for further processing into a composite structure.

6. The method of claim 5 further comprising guiding said strand in a pattern of repeating, closed, geometrical shapes.

7. The method of claim 6 further comprising guiding said strand in a pattern of overlapped rows of shingled loops 8. The method of claim 7 further comprising guiding said strand through a freely rotatable tube programmed for movement according to said pattern, said tube terminating in a curved length projecting into said bed of pins.

* * * * *